US006276042B1

(12) United States Patent
Hammond

(10) Patent No.: US 6,276,042 B1
(45) Date of Patent: Aug. 21, 2001

(54) DRIVE BELT QUICK CHANGE TOOL AND METHOD

(76) Inventor: Jim Hammond, 4618 Carrington Way, Hilliard, OH (US) 43026

( * ) Notice: Subject to any disclaimer, the term of this patent is extended or adjusted under 35 U.S.C. 154(b) by 0 days.

(21) Appl. No.: 09/440,723

(22) Filed: Nov. 16, 1999

Related U.S. Application Data

(63) Continuation-in-part of application No. 09/249,829, filed on Feb. 12, 1999, now abandoned.

(51) Int. Cl.[7] ...................................................... B23P 11/02

(52) U.S. Cl. ............................. 29/446; 29/270; 29/281.1; 29/452; 254/266; 81/64; 24/273

(58) Field of Search ............................. 29/235, 270, 271, 29/281.1, 446, 452; 81/57.43, 57.19, 57.13, 57.3, 64, 3.43; 254/390, 371, 213, 375; 474/252, 253, 254, 255

(56) References Cited

U.S. PATENT DOCUMENTS

| | | | | |
|---|---|---|---|---|
| 290,351 | * | 12/1883 | Parry | 81/64 |
| D. 308,478 | | 6/1990 | Watson | D8/367 |
| 916,169 | * | 3/1909 | Langford | 81/64 |
| 1,774,201 | * | 8/1930 | Jenkins . | |
| 3,841,168 | | 10/1974 | Daniels | 74/231 J |
| 4,145,938 | * | 3/1979 | Laird | 81/64 |
| 4,345,494 | * | 8/1982 | Aamodt . | |
| 4,929,222 | | 5/1990 | Smith et al. | 474/255 |
| 5,011,462 | | 4/1991 | Smith | 474/255 |
| 5,340,085 | * | 8/1994 | Keibler | 254/375 |
| 5,577,310 | * | 11/1996 | Cheene-Astorino et al. | 29/235 |
| 5,661,868 | * | 9/1997 | Panagakos et al. . | |

* cited by examiner

*Primary Examiner*—P. W. Echols
*Assistant Examiner*—Steve Blount
(74) *Attorney, Agent, or Firm*—David A. Greenlee

(57) ABSTRACT

A method of connecting the free end of an elastomeric cord to the hook of a connector, that is attached to a loop on the other end of the cord, to form an endless drive belt to connect a pair of rotary drive members, which utilizes a novel tool. The tool has a retainer segment and a contact segment comprising a pair of curved contact arms flanking a finger and forming an opening, and a handle. The tool contact segments are placed on one of the rollers with the finger in the roller drive groove and the handle resting on an adjacent roller. The connector and attached cord end loop are placed in a retainer pocket on the finger. The cord free end is then grasped and pulled around both rollers, which clamps the tool to the roller, and onto the hook to form the endless belt. The handle is grasped to raise the tool, pivot it around the roller to unclamp the tool, and slide the tool to disengage it from the drive belt. Alternative forms of the tool eliminate one of the curved segments, or eliminate both curved segments, or replaces the finger with a slot. A preferred form of tool another has a pair of lateral slots defining a finger which enables use with both C-shaped and S-shaped connectors.

14 Claims, 17 Drawing Sheets

DRIVE BELT QUICK CHANGE TOOL AND METHOD

This application is a continuation-in part of application Ser. No. 09/249,829 filed Feb. 12, 1999, now abandoned.

TECHNICAL FIELD

This invention relates to elastomeric drive belts and, more particularly, to a tool for use in a method of replacing a worn or broken belt.

BACKGROUND OF THE INVENTION

Connectable elastomeric drive belts have long been used on live-roller conveyors where it is either impractical or impossible to install continuous belts which interconnect two or more rollers or a roller and a drive shaft. These belts are also referred to in the trade as "Quick-Connect"™ or "zero downtime" belts. Connectable belts are looped about the rollers and the free ends are interconnected by a connector. In many applications the connectable belts are made of polyurethane and are permanently twisted to include a loop at either end. These loops are then interconnected by a plastic or metal connector having two hooks, usually in the form of an "S" or "C" shape.

These twisted elastomeric belts are normally supplied with a hook mounted on one end of the loop. These belts are difficult to install when a belt breaks and must be replaced. To install, one end of the belt must be held static, usually by grasping the free end, while the hook connector is looped around the two rollers and the belt is stretched to enable the end loop to engage the connector hook. The force required to stretch the urethane belt is significant, thus making it extremely difficult, and often impossible, for one person to accomplish this task. This is especially so because the urethane is slippery and only one hand and arm are available to do the stretching, since the other hand must hold the one end static.

Another problem encountered in replacing one of these belts is the physical environment. Frequently, the rollers are closely spaced, or are positioned close to a supporting frame and guards, making the area beneath the rollers nearly inaccessible. Further complications arise with some of the connecting hooks in use, which require that the free end loop be pinched and forced into a narrow hook entry slot, necessitating significant thumb pressure.

The conventional solution to the installation problems chronicled above is to partially disassemble the conveyor rollers to move them closer together, thus avoiding the need to stretch the belt by hand. After the belt is thusly installed, the roller is moved back to its original positioned and secured. This avoids the manual strain, but involves stopping the conveyor system for a significant time period, and is labor intensive and, hence, expensive. This method still requires manual thumb pressure to force the free end loop into the narrow hook entry slot.

A problem common to line-shaft conveyors is the unintentional, but all-too-frequent instance of installing a belt backwards. This will cause the roller to rotate in the wrong direction, a problem identified only after the belt installation is completed. At this point, disconnection of the belt is very difficult and sometimes nearly impossible, because of the belt tension and entrapment of the loops in the hooks by the narrow entry slots. Thus, correction often entails cutting and destroying the newly installed belt, and installing another one.

There is a need for a new method of replacing and installing elastomeric drive belts that is simpler, less labor intensive and less expensive.

SUMMARY OF THE INVENTION

It is therefore an object of this invention to provide a method of replacing and installing elastomeric drive belts that is simpler, less labor intensive and less expensive.

In one aspect this invention features a method of connecting the free end of an elastomeric cord to the hook of a connector that is attached to the other end of the cord to form an endless drive belt that drivingly connects a pair of rotary drive members, comprising the steps of providing a tool having a retainer segment and a contact segment, engaging the connector with the retainer segment, engaging the contact segment with one of the drive members to immobilize the tool and connector, grasping the cord free end and stretching the cord to loop it around the drive members, engaging the cord free end with the connector hook to form the endless drive belt, and disengaging the tool retainer segment from the connector.

Preferably, the method includes the additional steps of providing the tool with a handle portion, moving the cord free end onto the tool retainer segment to engage the cord free end with the connector hook to form the endless drive belt, grasping the handle portion to pivot the tool to force the connector and cord end loops off the retainer segment, and removing the tool.

In another aspect, this invention features a tool used in the above method for facilitating the connection of the free end of the elastomeric cord to the hook of the connector which comprises a retainer segment engaging the connector, and a contact segment engaging one of the drive members to immobilize the tool and connector while the cord free end is looped around the drive members and stretched to engage the connector hook to form the endless drive belt.

Preferably, the retainer segment is a finger and the contact segment comprises a pair of spaced curved portions which flank the finger, engage the one rotary drive member, and define an opening which enables movement of the cord free end to engage the connector hook, and a handle portion is provided to enable pivoting of the tool to force the connector and loops off the finger.

DESCRIPTION OF THE PREFERRED EMBODIMENT

Figure 1A:
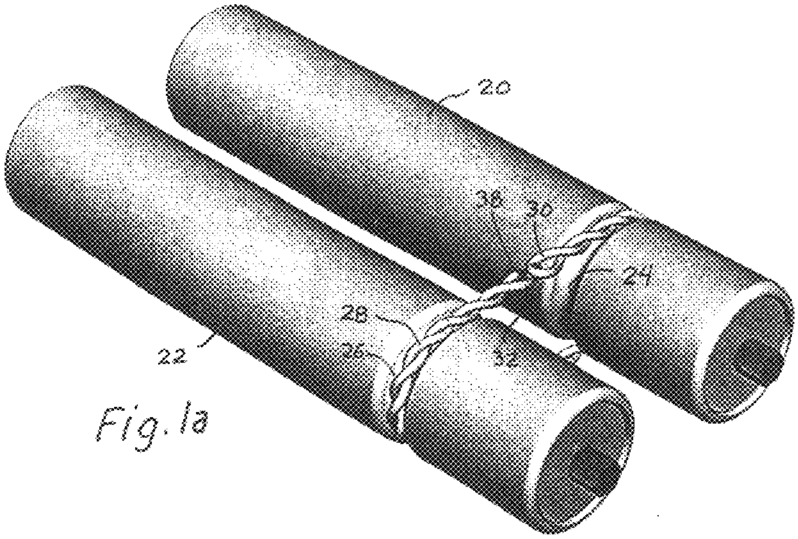
FIG. 1*a* is a perspective view of adjacent conveyor rollers drivingly interconnected by an elastomeric drive belt.
Figure 1B:
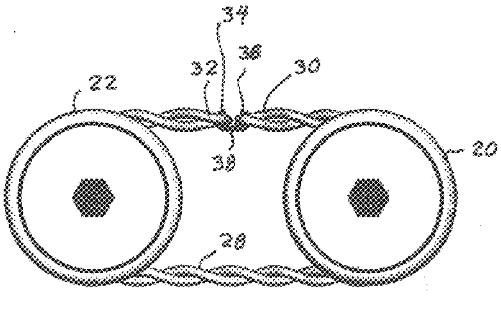
FIG. 1*b* is an end view of the FIG. 1 arrangement.

As shown in FIG. 1 a roller conveyor (not illustrated in its entirety) includes a pair of rotary drive members in the form of rollers 20 and 22 having respective drive grooves 24 and 26 that are drivingly interconnected by an endless elastomeric drive belt 28. Either roller may be the drive roller, with the other being the driven roller. Conveyors of these rollers are in common use throughout industry in material handling systems. One user of these conveyors is the U.S. Postal Service, which utilizes them to convey totes of mail and packages.

Belt 28 is illustrated as a twisted polyurethane cord having end loops 30 and 32 connected by hook portions 34 and 36 of a C-shaped plastic connector 38 to form the endless drive belt. Elastomeric belts of untwisted urethane cord are also used. Both types of belts also often use metal S-shaped hooks. Although they are surprisingly durable, these belts become limp or are damaged from time to time and break. This requires replacement, with all the attendant problems chronicled above.

Figure 2:
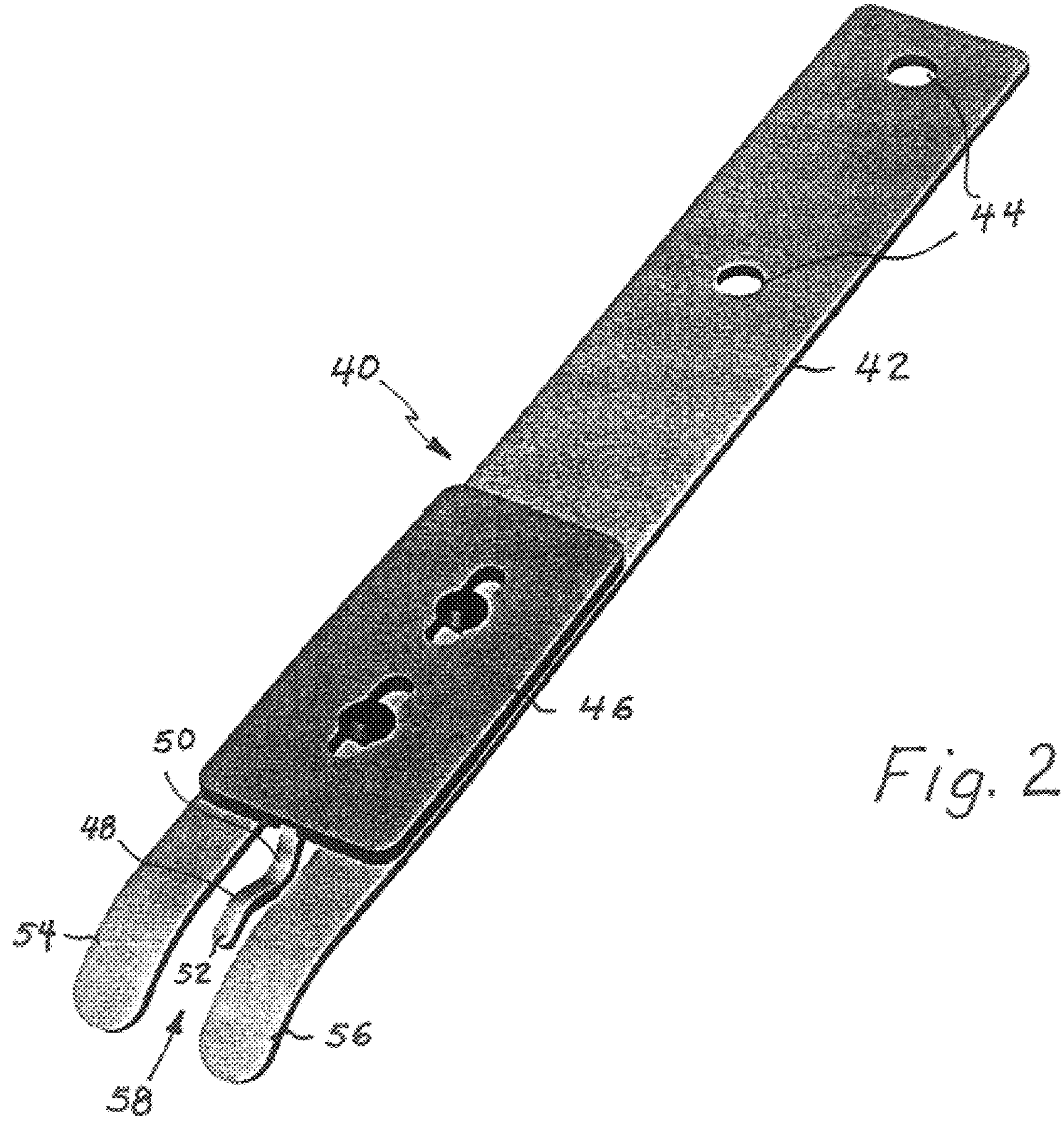
FIG. 2 is a perspective view of a drive belt replacement tool according to this invention.
Figure 3:
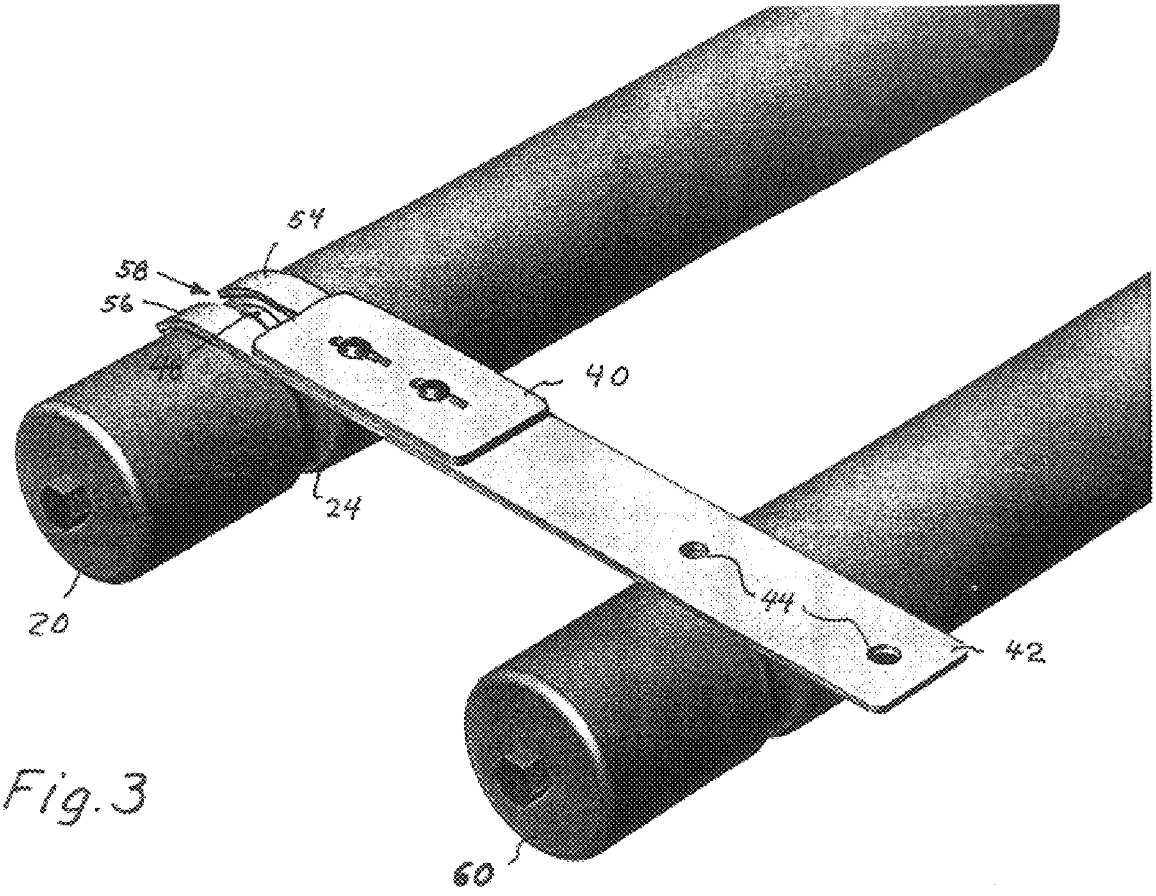
FIG. 3 is a perspective view of the tool of FIG. 2 installed for belt replacement.

To facilitate this belt replacement, a tool 40, shown in FIGS. 2 and 3 is provided. Tool 40 comprises a handle segment 42 having a series of spaced holes 44. A main segment 46 mounts a forwardly-extending retainer segment or finger 48 which includes a pocket 50 and a nose 52. A bifurcated, curved contact segment comprising spaced arms 54 and 56 flank finger 48 and define an entry slot 58.

Figure 4:
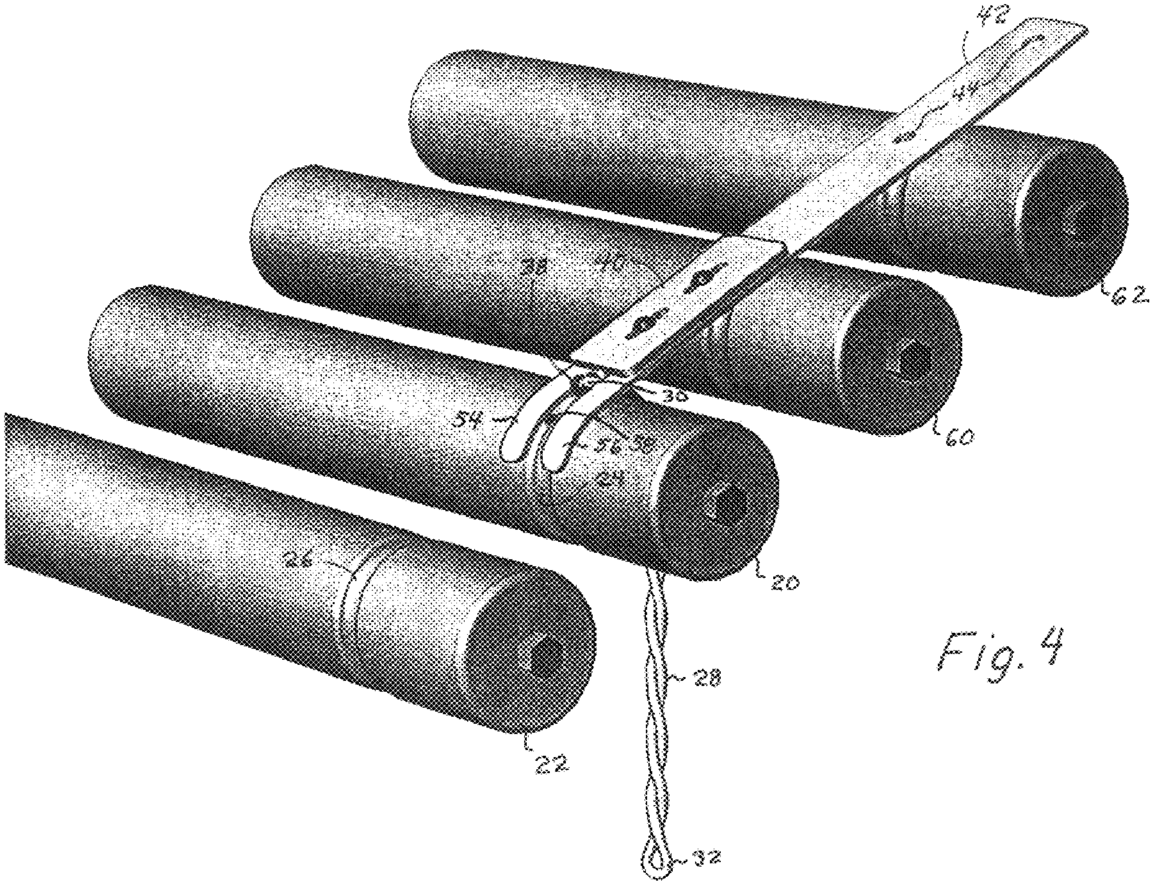
FIG. 4 is a different perspective view of the tool of FIG. 3 with one end of a replacement belt and connector installed on the tool.
Figure 5:
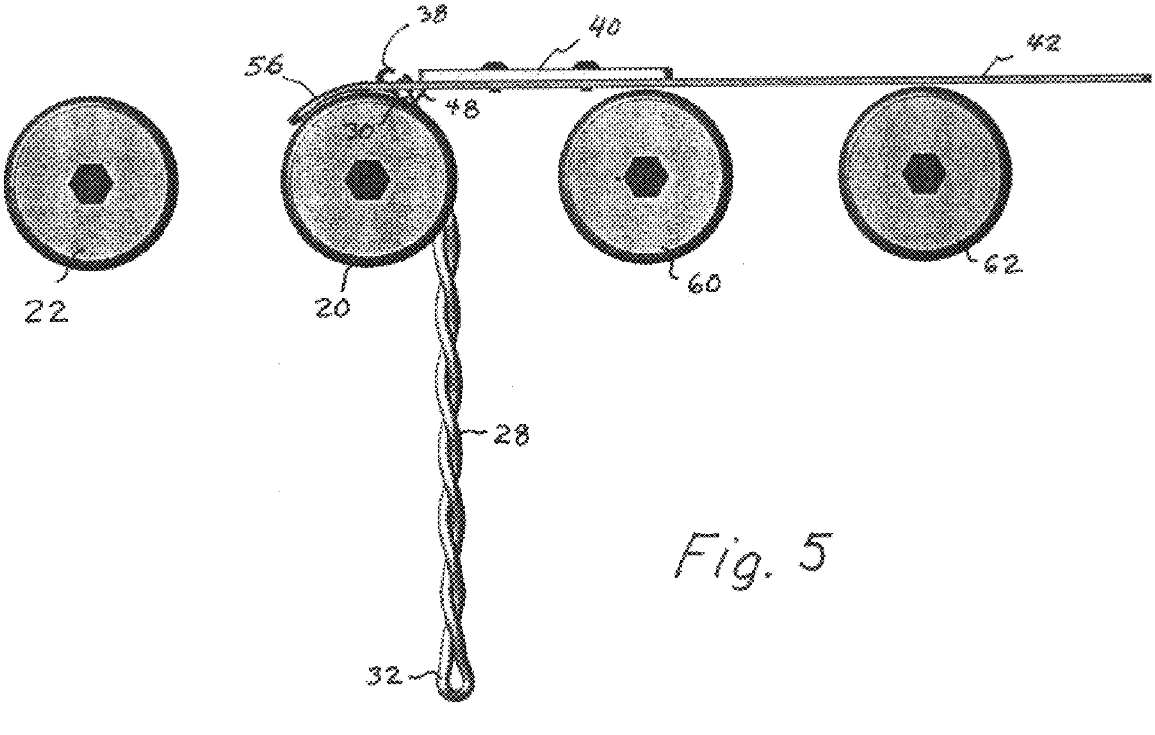
FIG. 5 is an end view of FIG. 4, illustrating the belt free end hanging from the tool.

To replace a broken or defective belt, the belt is removed, if it is still in place, by cutting it. As shown in FIGS. 4 and 5, an end loop 30 of a new belt 28 is inserted into hook 34 of connector 38, which is then inserted over nose 52 of finger and into pocket 50 of tool 40. With belt 28 so installed, tool 40 is placed atop rollers 20 and 22 with handle segment 42 atop adjacent conveyor rollers 60 and 62, with the nose 52 of finger 48 in groove. In this position, curved contact segment arms 54 and 56 engage portions of roller 20 astride groove 24. As shown, the loop 32 on the free end of belt 28 now hangs down the backside of groove 24 between rollers 20 and 60.

Figure 6:
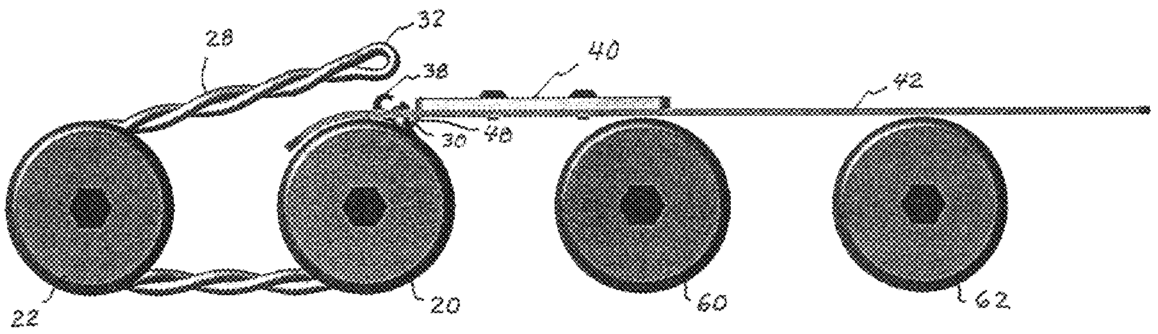
FIG. 6 is a view similar to FIG. 5, with the replacement belt shown looped around the rollers just prior to connection of the free end to the connector.
Figure 7:
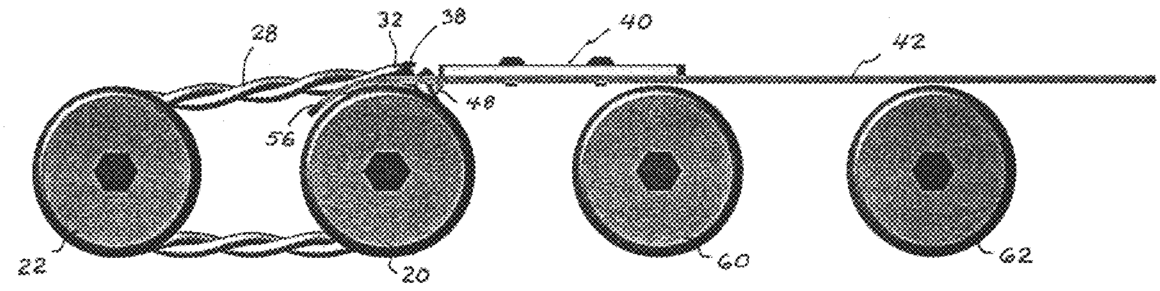
FIG. 7 is a view similar to FIG. 6, with the belt free end connected to the connector.

Loop 32 can now be readily manually grasped by the installer's hand or by a fishing tool (neither illustrated) and looped around rollers 20 and 22 in grooves 24 and 26 to the position shown in FIG. 6. Belt 28, being elastomeric, can then be stretched lengthwise sufficiently (by two hands, if necessary) and inserted onto hook 38 of connector 38, as shown in FIG. 7, to create the endless drive belt. During this looping and stretching, connector 38 and belt end loop 30 are immobilized by retention in finger pocket 50 and the contact of tool 40 with rollers 20 and 60. The more force that is placed on belt 28 by stretching, the greater is the force clamping tool 40 to rollers 20 and 60.

Figure 8:
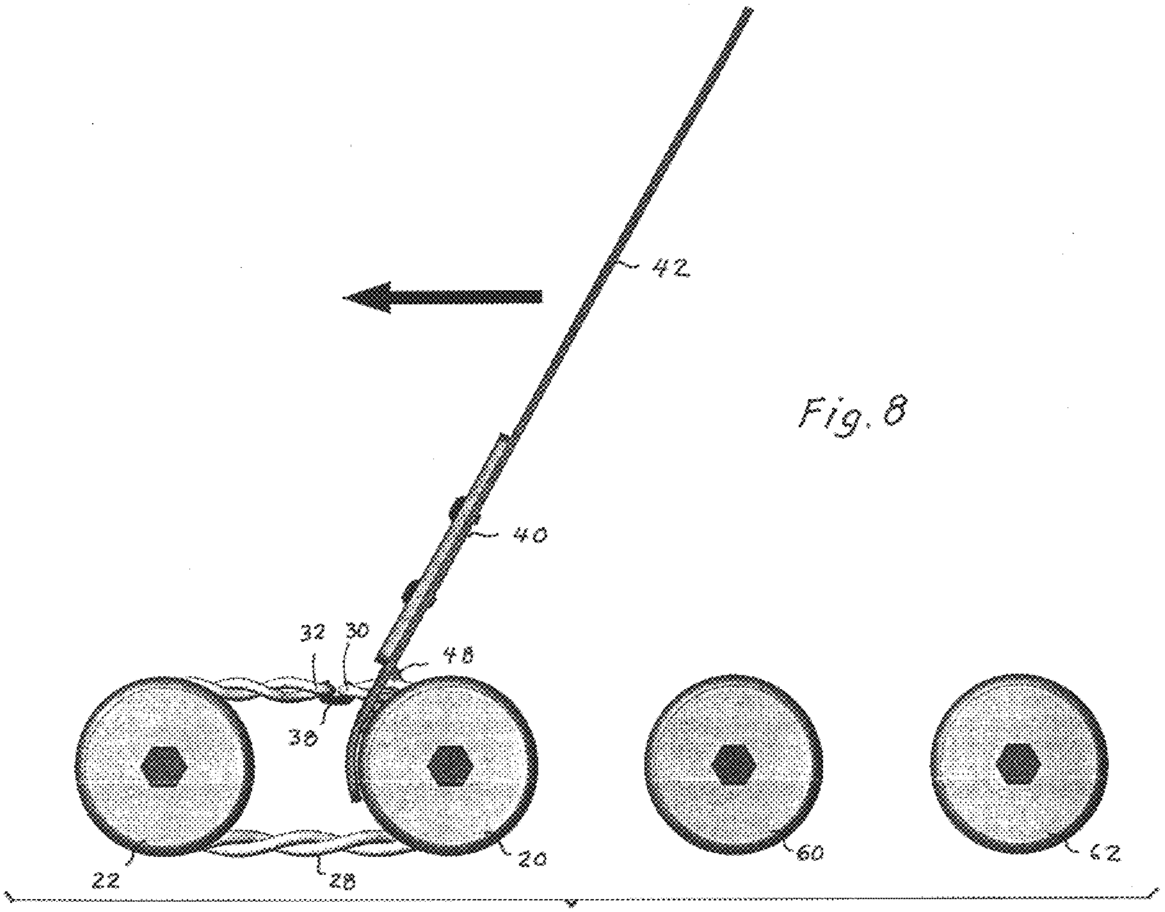
FIG. 8 is a view similar to FIG. 7, with the tool shown being detached from the belt end loops and connector.

After belt 28 is connected to connector 38, handle segment 42 is manually lifted, or pried up, and rolled forwardly, as shown in FIG. 8. This tilts finger 48 and moves and stretches belt 28, which forces connector 38 out of pocket 50, which enables removal of tool 40, with belt 28 sliding through slot 58.

In this manner, an elastomeric drive belt may be simply, expeditiously and inexpensively replaced. This minimizes conveyor downtime and maximizes manpower utilization.

Figure 9:
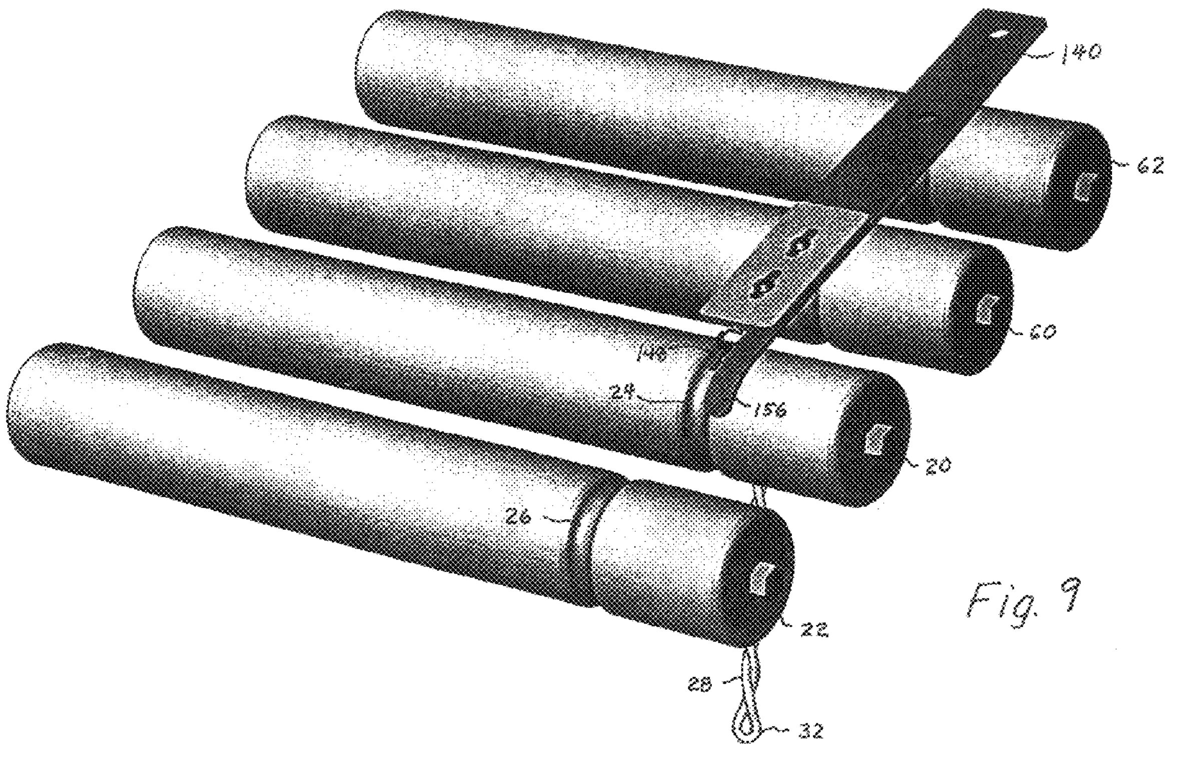
FIG. 9 is perspective view illustrating another embodiment of tool according to this invention.
Figure 10:
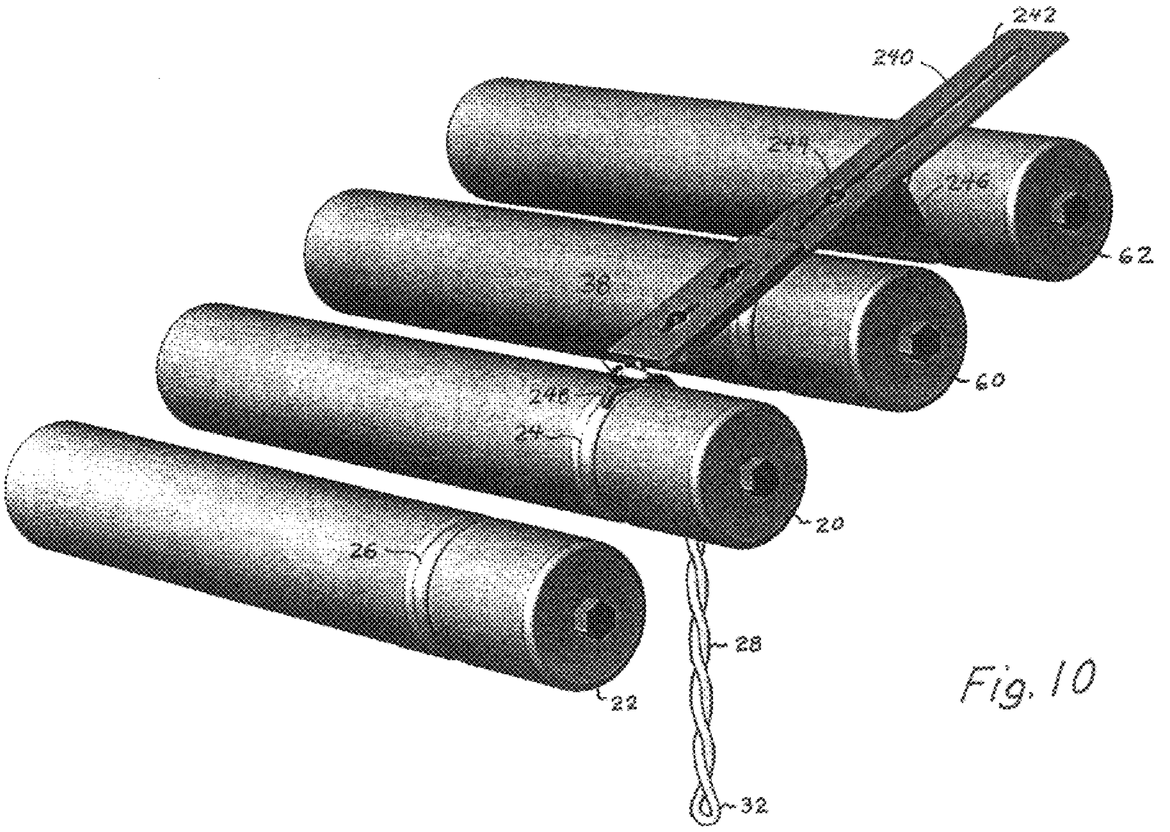
FIG. 10 is perspective view illustrating yet another embodiment of tool according to this invention.

Other embodiments of the tool of this invention are illustrated in FIGS. 9–13. In FIG. 9, one of the contact arms is eliminated, and a tool 140 includes a single curved contact arm 156 spaced from a finger 148. In FIG. 10, both curved contact arms are eliminated and a tool 240 includes a slot 242 that received a bolt 244 which mounts a brace plate 246, which is wedged against an adjacent roller 62. The force of backward pressure on finger 248 caused by the stretching and looping of belt 28 tends to push the brace plate against roller 62. This prevents tool 40 from moving backward.

Figure 11:
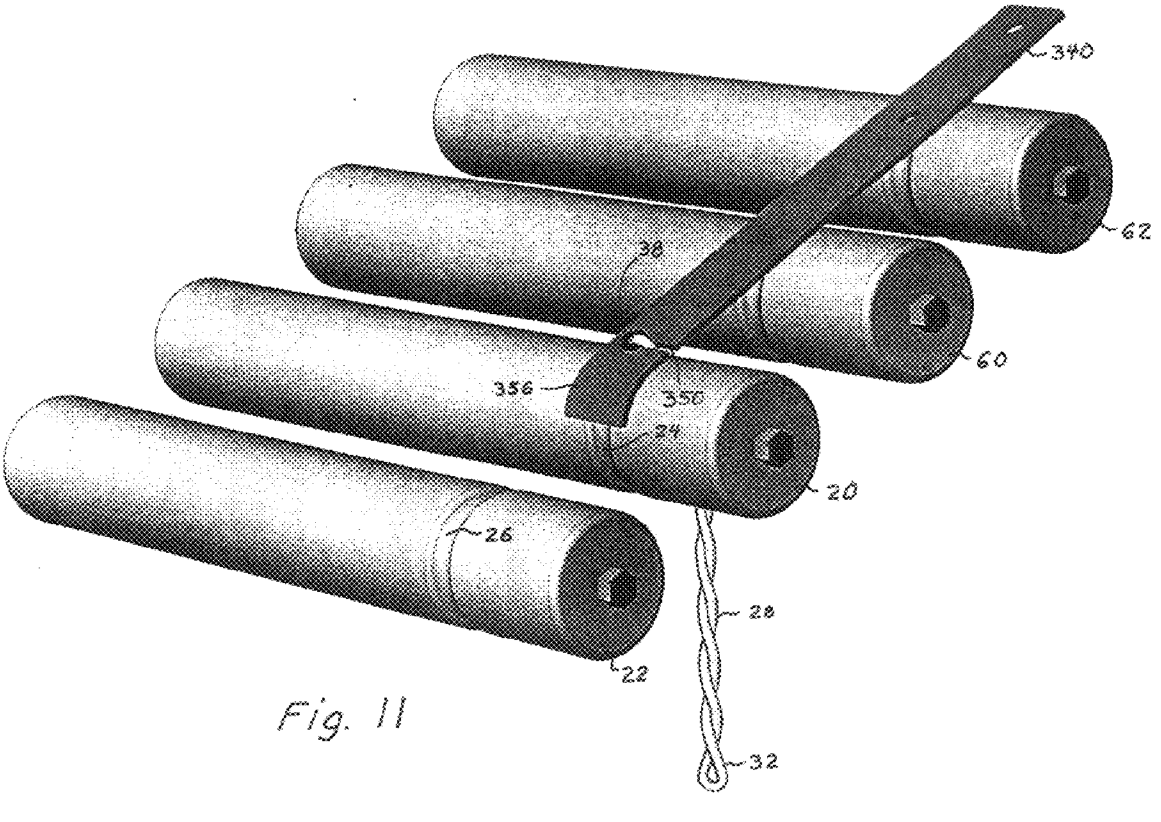
FIG. 11 is perspective view illustrating a further embodiment of tool according to this invention.
Figure 12:
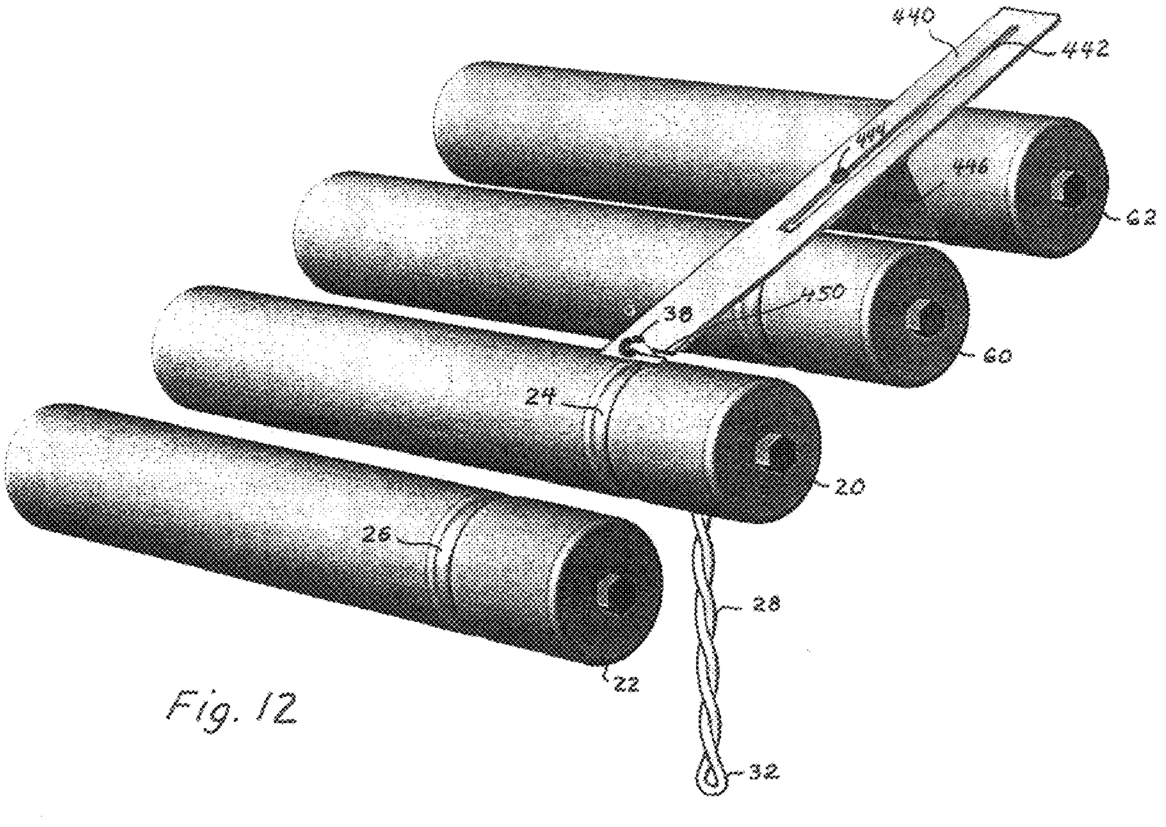
FIG. 12 is perspective view illustrating a yet further embodiment of tool according to this invention.

In FIG. 11, a tool 340 has a unitary curved contact portion 356 and eliminates the retention finger. Retention of belt loop 30 and the attached connector 38 is provided by a slot 350, which is narrower than the width of connector 38, but wide enough to admit end loop 30. FIG. 12 depicts a combination of the FIGS. 10 and 11 embodiments. Here, a tool 440 has a slot 442 that receives a bolt 444 that secures a brace plate 446. Also included is a connector retention slot 450.

Figure 13:
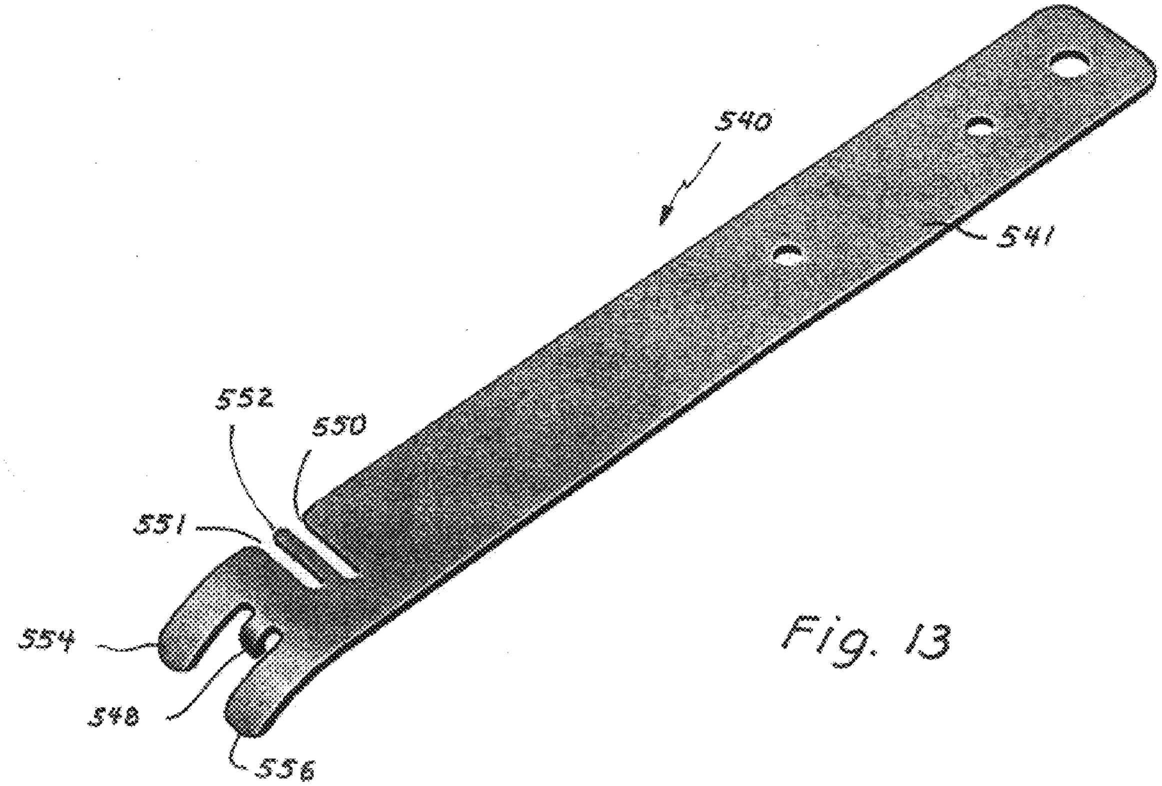
FIG. 13 is a perspective of a still further and preferred embodiment of tool according to this invention.

FIG. 13 shows a tool 540 which evolved from experimenting with the tools illustrated in the preceding drawing FIGS. Here tool 540 has a contact segment that includes spaced arms 554 and 556 which flank a locating finger 548. A pair of lateral, unequal-length slots 550, 551, which define a finger 552, form the retainer segment and are located on flat handle portion 541.

Figure 14:
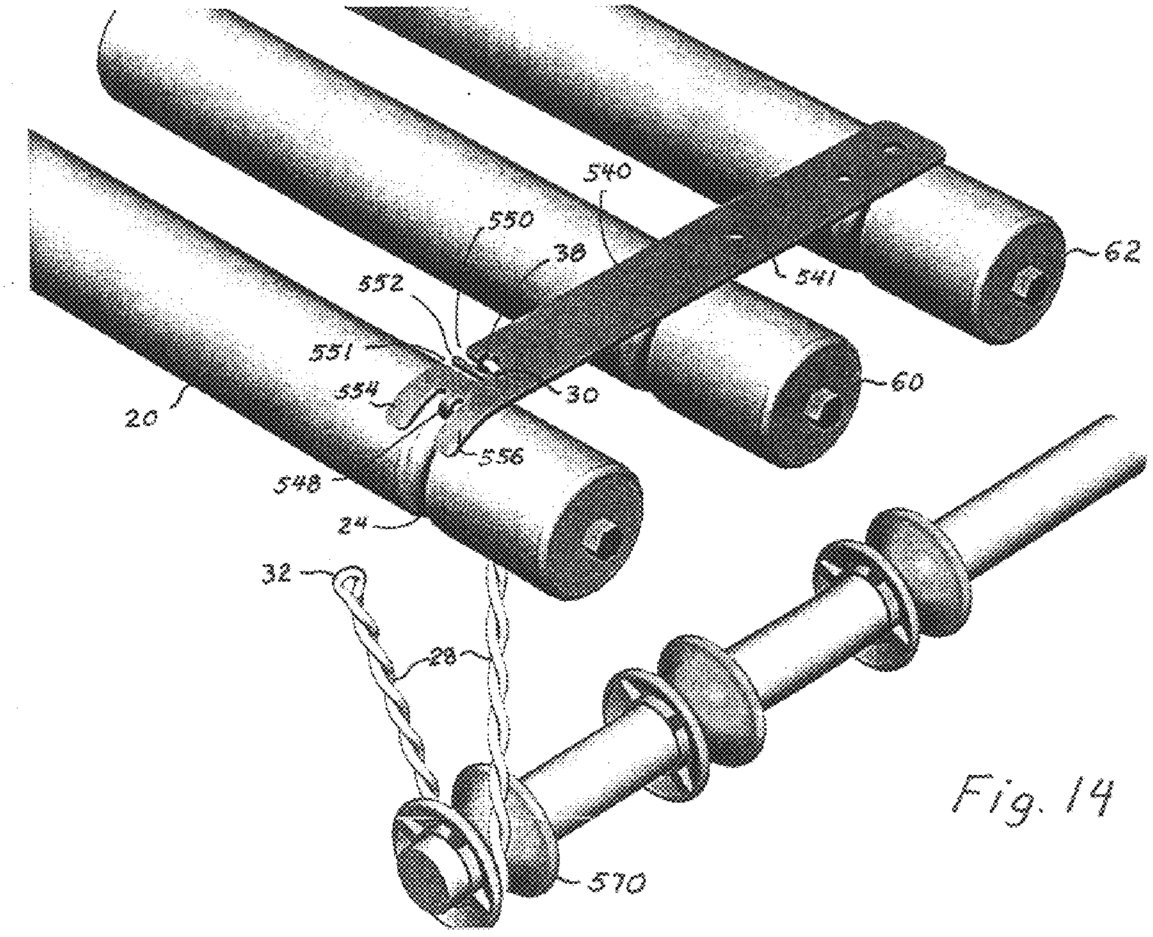
FIG. 14 is a perspective view of the tool of FIG. 13 in use with a C-shaped connector.

FIG. 14 shows tool 540 in use with a C-shaped connector 38. Tool 540 is laid on the conveyor, with arms 554 and 556 on roller 20 and finger 552 in groove 24 to properly locate tool 540. Tool handle 541 lies atop adjacent rollers 60 and 62. Belt end loop 30 is inserted into slot 550 with connector 38 above tool 540. As shown, this locates connector 38 directly above groove 24 and oriented parallel to the groove. Belt 28 is then looped about a lower drive shaft pulley and free end loop 32 is pulled up over locating finger 552 and inserted into the free end hook of connector 38 to form the endless belt. Stretching of belt 28 clamps arms 554 and 556 to roller 20 and handle 541 to rollers 60, 62, which maintains connector 38 in place. After the belt is connected, tool handle 541 is then grasped and lifted to push connector 38 around roller 20, much as shown in FIG. 8, whereupon tool 540 is unclamped from roller 20 and is then slipped sideways to disengage belt end 30.

Figure 15:
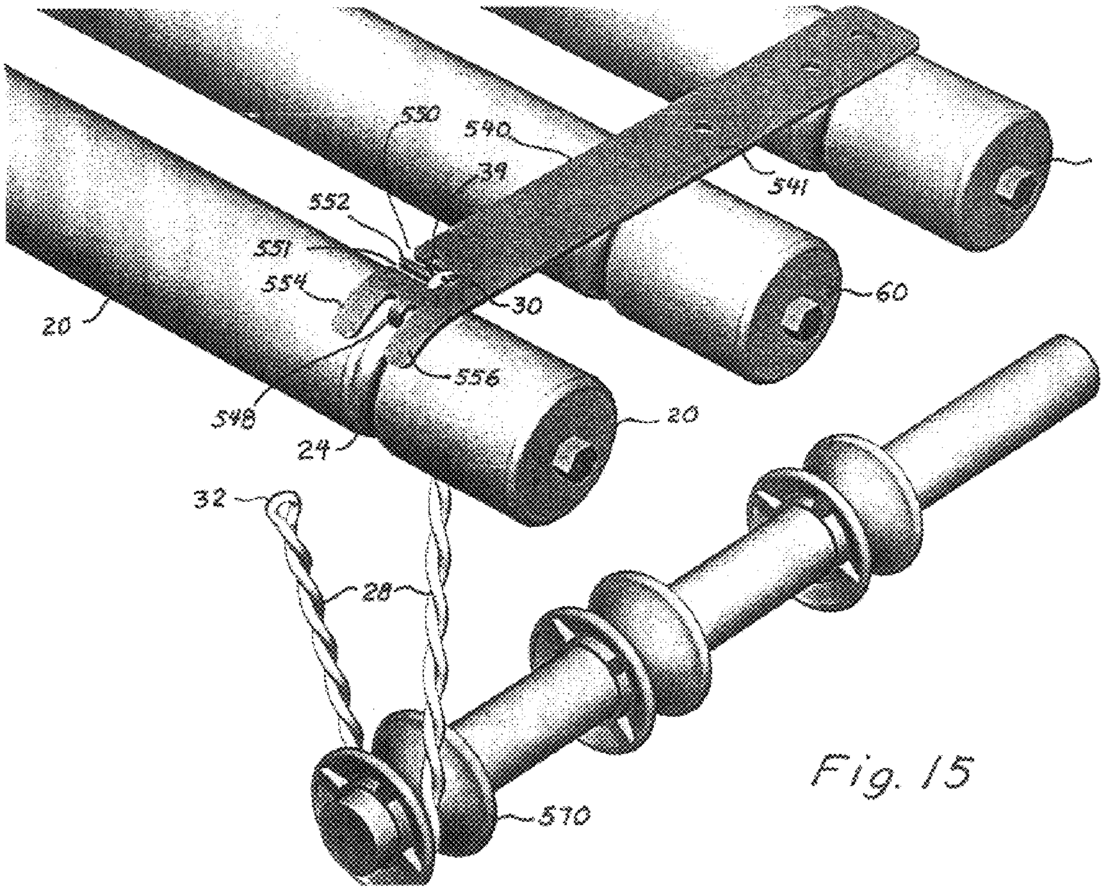
FIG. 15 is a perspective view of the tool of FIG. 13 in use with an S-shaped connector.

FIG. 15 shows tool 540 used with an S-shaped connector 39, which has one hook attached to belt end 30 and its other, perpendicular hook free for later attachment to belt free end 32. In this instance, belt end 30 is looped over finger 552 and inserted to the end of shorter slot 551, which centers the free hook of connector 39 over and parallel to groove 24. Operation is as described just above.

The unequal lengths of slots 550 and 551 enable the centering of the free end hooks of both the S-shaped 39 or C-shaped 38 connectors over roller slot 24 to facilitate attachment of the belt free end loop 32. The provision of both the slots and the finger and their use, dependent on which type connector is used, assures that the free hook ends are located parallel to the groove to facilitate attaching the belt free end. When used with the C-shaped connector 38, belt end loop 30 is inserted sideways into longer slot 550, which positions connector 38 directly over, with its free hook parallel to roller groove 24. When used with S-shaped connector 39, belt end loop 30 is slipped over finger 552 and moved inward. Shorter slot 551 limits this inward movement to position connector 39 directly over with its free hook parallel to roller groove 24.

Figure 16:
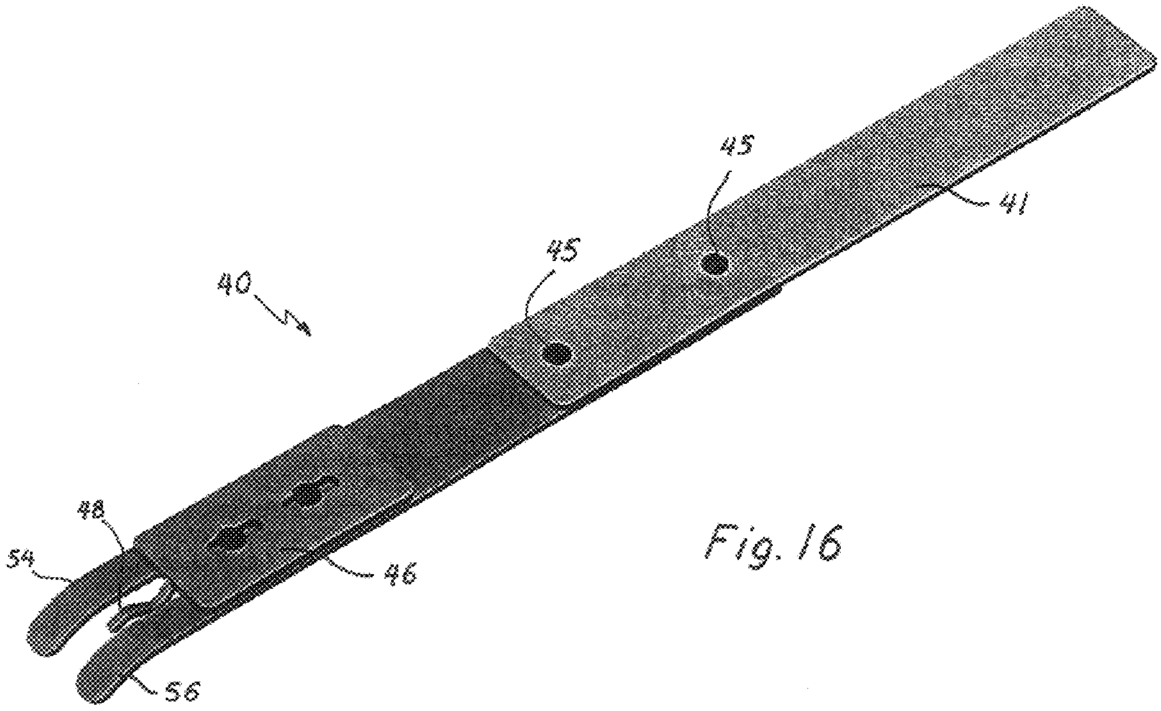
FIG. 16 is a view similar to FIG. 2 illustrating a tool with optional handle extender installed.

FIG. 16 illustrates tool 40 as shown in FIG. 1, but with a handle extension 41 installed. Bolts 45 are received in holes 44 to secure handle extension 41, which provides an adjustable extension for tool 40, provided by the plurality of holes 44. This handle extension is useful in situations where adjacent rollers are widely spaced or where no rollers are available and conveyor structure must be utilized.

Figure 17:
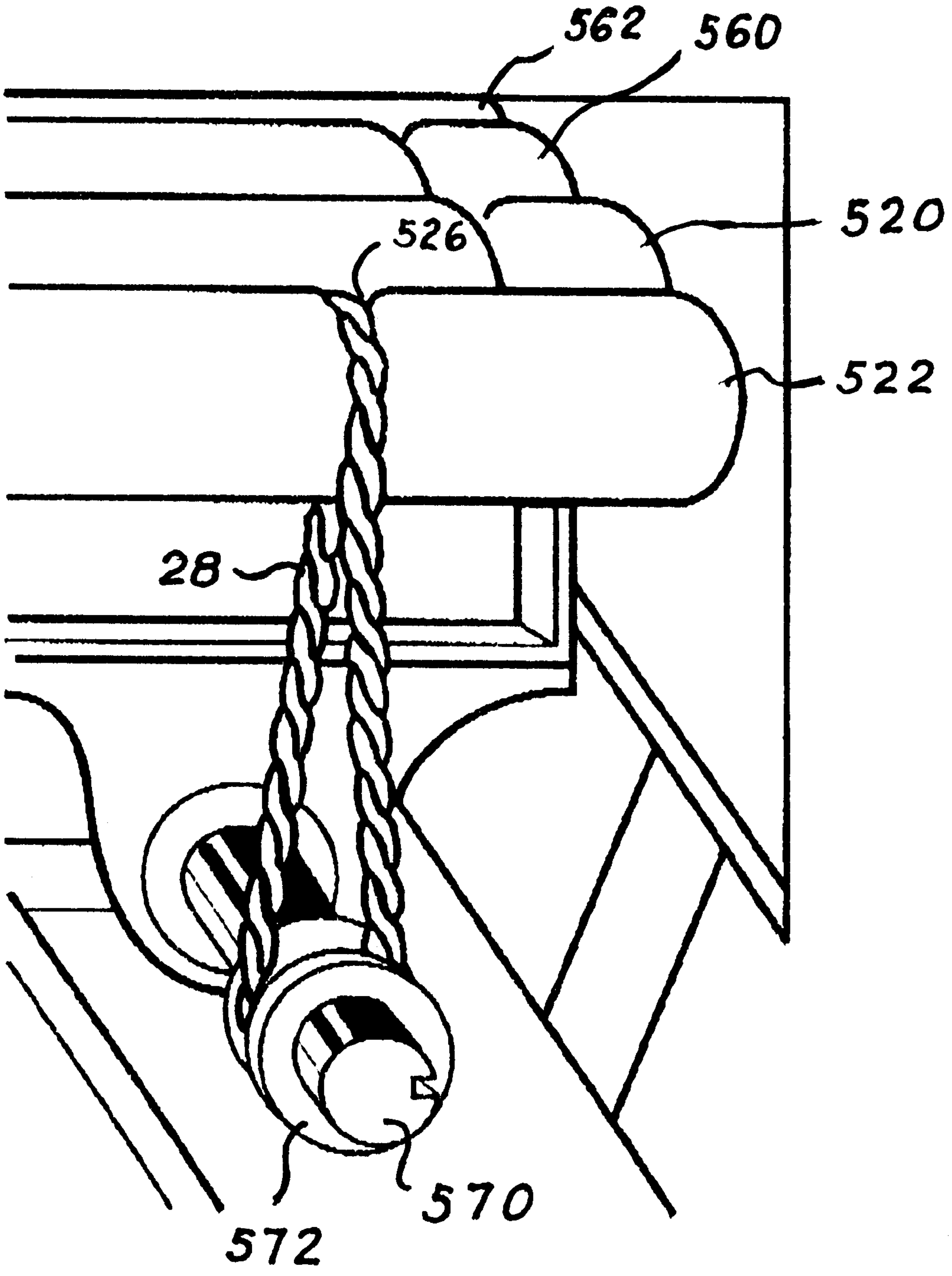
FIG. 17 is a perspective view of a line shaft conveyor employing a twisted cord endless drive belt of the type disclosed.

A line-shaft conveyor system is depicted in FIG. 17. This is a popular type of conveyor which utilizes the twisted cord endless drive belt. Here rollers 520, 522, 560 and 562 are driven directly or indirectly by a power line shaft 570 which mounts a plurality of drive spools, only one of which, spool 572 is shown. Drive belt 528 drivingly connects a rotary drive member in the form of spool 572 and groove 526 of the other rotary drive member in the form of roller 522. The tool and method of this invention are particularly useful in replacing drive belts in this type of conveyor system, due to the inaccessibility of the drive shaft pulley, as is readily apparent.

While only preferred and alternative embodiments of this invention have been shown and described, many modifications may be made without departing from the scope of this invention, as defined by the appended claims.

I claim:

1. A tool for facilitating the connection of the free end of an elastomeric cord to the hook of a connector that is attached to the other end of the cord to form an endless drive belt that drivingly connects a pair of rotary drive members, each of which has a drive groove comprising a retainer segment for engaging and temporarily retaining the connector, and a contact segment engaging one of the drive a finger insertable into the drive groove of one of the drive members to position the connector above the drive groove, members to immobilize the tool and connector while the cord free end is looped around the drive members and stretched to engage the connector hook to form the endless drive belt.

2. The tool of claim 1, including a handle segment enabling movement of the tool to disengage the contact segment from the connector after the endless drive belt is formed.

3. The tool of claim 2, wherein the contact segment includes a curved arm for engaging a portion of said one rotary drive member to prevent inadvertent movement of the connector during stretching of the cord.

4. The tool of claim 2, wherein the retainer segment is the finger and the contact segment comprises a pair of spaced curved arms which flank the finger, engage a portion of the one rotary drive member, and define a slot which enables removal of the tool from the endless belt when formed.

5. The tool of claim 4, wherein the handle segment includes means for attaching a handle extension.

6. The tool of claim 1, wherein the retainer segment is a finger and the contact segment is a spaced curved portion spaced from the finger and engages a portion of said one rotary drive member.

7. The tool of claim 1, wherein the contact segment comprises a finger which contacts a portion of one of the drive members, and the retainer segment is a pocket formed on the finger which receives and temporarily retains the connector such that the cord free end can be looped about the rotary members and moved over the finger to engage the connector hook.

8. The tool of claim 1, wherein the retainer segment is a slot formed in the contact segment which receives and temporarily retains the connector such that the cord free end can be looped about the rotary members and moved through the slot to engage the connector hook.

9. The tool of claim 1, wherein both belt ends are loops, the connector has a C-shape, and the retainer segment is a transverse slot for receiving the free end loop and positioning the connector hook above the tool.

10. The tool of claim 1, wherein both belt ends are loops, the connector has an S-shape, and the retainer segment has a transverse finger for receiving the other end loop and positioning the connector hook above the tool.

11. The tool of claim 1, wherein both belt ends are loops, the retainer segment comprises a pair of parallel transverse slots defining a finger, enabling use with both a C-shaped connector and an S-shaped connector, with the finger used for receiving the belt other end loop and attached S-shaped connector, and one of the slots used for receiving the belt other end loop, thereby positioning the connector hooks above the tool and oriented to facilitate attachment of the belt free end loop with the connector hook.

12. A tool for facilitating the connection of the free end of an elastomeric cord to the hook of a connector that is attached to the other end of the cord to form an endless drive belt that drivingly connects one of a plurality of rollers to a drive shaft of a line-shaft conveyor, said one roller having a drive groove for receiving the drive belt, comprising a finger insertable into the drive groove to locate the tool on the one roller, a second portion comprising a pair of spaced curved segments flanking the finger and engaging the one roller, a connector retainer comprising a pair of slots defining a finger for receiving the cord other end to position the connector above the roller drive groove with the hook aligned with said groove, and a handle portion for engaging one of the adjacent rollers which coacts with the second portion to immobilize the tool and connector while the cord free end is looped around said one roller and the drive shaft and stretched to engage the connector hook to form the endless drive belt.

13. A method of connecting the free end of an elastomeric cord to the hook of a connector that is attached to the other end of the cord to form an endless drive belt that drivingly connects a pair of rotary drive members in a conveyor, at least one of which has a drive groove, comprising the steps of providing a tool having a retainer segment and a contact segment, engaging the retainer segment with the cord other end and the connector, engaging the contact segment with one of the drive members to position the connector above the drive groove, grasping the cord free end and stretching the cord to loop it around the drive members, thereby clamping the tool to the one drive member, engaging the cord free end with the connector hook to form the endless drive belt, and disengaging the tool retainer segment from the connector.

14. The method of claim 13, including the additional steps of providing the tool with a handle portion, grasping the handle portion to pivot the tool around the one drive member to a position to unclamp the tool, and manipulating the handle to disconnect the tool from the drive belt.

* * * * *